United States Patent
Leung (10) Patent No.: US 7,149,229 B1
(45) Date of Patent: Dec. 12, 2006

(54) MOBILE IP ACCOUNTING

(75) Inventor: Kent K. Leung, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/227,398

(22) Filed: Jan. 8, 1999

(51) Int. Cl.
*H04J 3/16* (2006.01)
(52) U.S. Cl. .................... 370/466; 455/428; 455/432.1; 455/411; 455/406
(58) Field of Classification Search ................ 455/406, 455/408, 422, 426, 405, 435, 427, 428, 436, 455/524, 403, 442, 512, 430, 574, 422.1, 455/435.1; 370/552, 522, 14, 389, 335, 229, 370/469, 352, 465, 401, 238, 328, 413, 466, 370/467, 252; 709/225, 249, 227, 229, 224
See application file for complete search history.

(56) References Cited

U.S. PATENT DOCUMENTS

| | | | |
|---|---|---|---|
| 5,793,762 A * | 8/1998 | Penners et al. ............. 370/389 |
| 6,119,160 A * | 9/2000 | Zhang et al. ............... 709/224 |
| 6,148,074 A | 11/2000 | Miloslavsky et al. ........ 379/242 |
| 6,339,830 B1 | 1/2002 | See et al. .................... 713/202 |
| 6,377,982 B1 * | 4/2002 | Rai et al. .................... 709/217 |
| 6,535,493 B1 * | 3/2003 | Lee et al. .................... 370/329 |
| 6,636,894 B1 * | 10/2003 | Short et al. ................. 709/225 |
| 6,894,994 B1 * | 5/2005 | Grob et al. ................. 370/335 |
| 2002/0186688 A1 * | 12/2002 | Inoue et al. ................ 370/352 |

* cited by examiner

*Primary Examiner*—Melody Mehrpour
(74) *Attorney, Agent, or Firm*—Beyer Weaver & Thomas LLP (57) ABSTRACT

Methods and apparatus for updating accounting information for a mobile node operating according to Mobile IP Protocol are disclosed. A network device which supports Mobile IP composes a request packet for the mobile node. The request packet identifies the mobile node and includes at least one counter associated with accounting information pertaining to the mobile node. The request packet is then sent to a server adapted for performing accounting. The server then logs the accounting information for the mobile node. The server may then send a reply packet to the network device acknowledging logging of the accounting information pertaining to the mobile node. A bill for Mobile IP services may then be generated from the accounting information.

38 Claims, 5 Drawing Sheets

MOBILE IP ACCOUNTING

BACKGROUND OF THE INVENTION

1. Field of the Invention

The present invention relates to Mobile IP network technology. More particularly, the present invention relates to Mobile IP accounting.

2. Description of the Related Art

Mobile IP is a protocol which allows laptop computers or other mobile computer units (referred to as "Mobile Nodes" herein) to roam between various sub-networks at various locations—while maintaining internet and/or WAN connectivity. Without Mobile IP or related protocol, a Mobile Node would be unable to stay connected while roaming through various sub-networks. This is because the IP address required for any node to communicate over the internet is location specific. Each IP address has a field that specifies the particular sub-network on which the node resides. If a user desires to take a computer which is normally attached to one node and roam with it so that it passes through different sub-networks, it cannot use its home base IP address. As a result, a businessperson traveling across the country cannot merely roam with his or her computer across geographically disparate network segments or wireless nodes while remaining connected over the internet. This is not an acceptable state-of-affairs in the age of portable computational devices.

To address this problem, the Mobile IP protocol has been developed and implemented. An implementation of Mobile IP is described in RFC 2002 of the Network Working Group, C. Perkins, Ed., October 1996. Mobile IP is also described in the text "Mobile IP Unplugged" by J. Solomon, Prentice Hall. Both of these references are incorporated herein by reference in their entireties and for all purposes.

Figure 1:
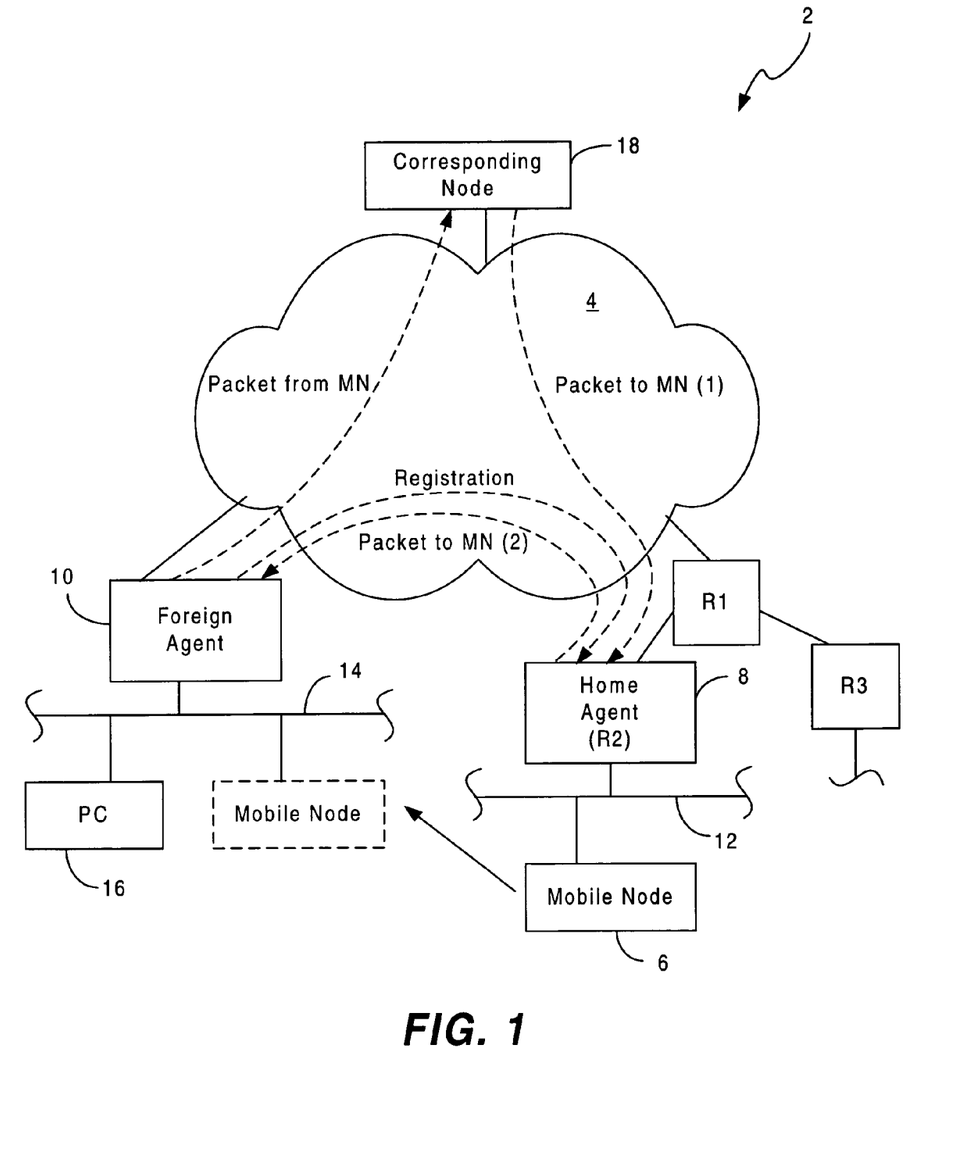
FIG. 1 is a diagram illustrating a Mobile IP network segment and associated environment.

The Mobile IP process and environment are illustrated in FIG. 1. As shown there, a Mobile IP environment 2 includes the internet (or a WAN) 4 over which a Mobile Node 6 can communicate remotely via mediation by a Home Agent 8 and a Foreign Agent 10. Typically, the Home Agent and Foreign Agent are routers or other network connection devices performing appropriate Mobile IP functions as implemented by software, hardware, and/or firmware. A particular Mobile Node (e.g., a laptop computer) plugged into its home network segment connects with the internet through its designated Home Agent. When the Mobile Node roams, it communicates via the internet through an available Foreign Agent. Presumably, there are many Foreign Agents available at geographically disparate locations to allow wide spread internet connection via the Mobile IP protocol. Note that it is also possible for the Mobile Node to register directly with its Home Agent.

As shown in FIG. 1, Mobile Node 6 normally resides on (or is "based at") a network segment 12 which allows its network entities to communicate over the internet 4 through Home Agent 8 (an appropriately configured router denoted R2). Note that Home Agent 8 need not directly connect to the internet. For example, as shown in FIG. 1, it may be connected through another router (a router R1 in this case). Router R1 may, in turn, connect one or more other routers (e.g., a router R3) with the internet.

Now, suppose that Mobile Node 6 is removed from its home base network segment 12 and roams to a remote network segment 14. Network segment 14 may include various other nodes such as a PC 16. The nodes on network segment 14 communicate with the internet through a router which doubles as Foreign Agent 10. Mobile Node 6 may identify Foreign Agent 10 through various solicitations and advertisements which form part of the Mobile IP protocol. When Mobile Node 6 engages with network segment 14, Foreign Agent 10 relays a registration request to Home Agent 8 (as indicated by the dotted line "Registration"). The Home and Foreign Agents may then negotiate the conditions of the Mobile Node's attachment to Foreign Agent 10. For example, the attachment may be limited to a period of time, such as two hours. When the negotiation is successfully completed, Home Agent 8 updates an internal "mobility binding table" which specifies the care-of address (e.g., a collocated care-of address or the Foreign Agent's IP address) in association with the identity of Mobile Node 6. Further, the Foreign Agent 10 updates an internal "visitor table" which specifies the Mobile Node address, Home Agent address, etc. In effect, the Mobile Node's home base IP address (associated with segment 12) has been shifted to the Foreign Agent's IP address (associated with segment 14).

Now, suppose that Mobile Node 6 wishes to send a message to a corresponding node 18 from its new location. An output message from the Mobile Node is then packetized and forwarded through Foreign Agent 10 over the internet 4 and to corresponding node 18 (as indicated by the dotted line "packet from MN") according to a standard internet protocol. If corresponding node 18 wishes to send a message to Mobile Node—whether in reply to a message from the Mobile Node or for any other reason—it addresses that message to the IP address of Mobile Node 6 on sub-network 12. The packets of that message are then forwarded over the internet 4 and to router R1 and ultimately to Home Agent 8 as indicated by the dotted line ("packet to MN(1)"). From its mobility binding table, Home Agent 8 recognizes that Mobile Node 6 is no longer attached to network segment 12. It then encapsulates the packets from corresponding node 18 (which are addressed to Mobile Node 6 on network segment 12) according to a Mobile IP protocol and forwards these encapsulated packets to a "care of" address for Mobile Node 6 as shown by the dotted line ("packet to MN(2)"). The care-of address may be, for example, the IP address of Foreign Agent 10. Foreign Agent 10 then strips the encapsulation and forwards the message to Mobile Node 6 on sub-network 14. The packet forwarding mechanism implemented by the Home and Foreign Agents is often referred to as "tunneling."

The Mobile IP Management Information Base (MIB) [RFC 2006] may be used by network administrators in managing mobile nodes, foreign agents, and home agents on a particular network. By way of example, the Mobile IP MIB defines a set of variables that can be examined or configured by a manager station using version 2 of the Simple Network Management Protocol (SNMPv2) [RFC 1905]. More particularly, variables are provided which permit accounting, or recording, of the actions of a particular mobile node. By way of example, an overall service time for the mobile node and the total number of registration requests accepted or denied by a Home Agent may be updated. This accounting information is typically stored on the corresponding network device (e.g., Home Agent or Foreign Agent) and therefore each network device may be periodically examined by the manager station.

Figure 2:
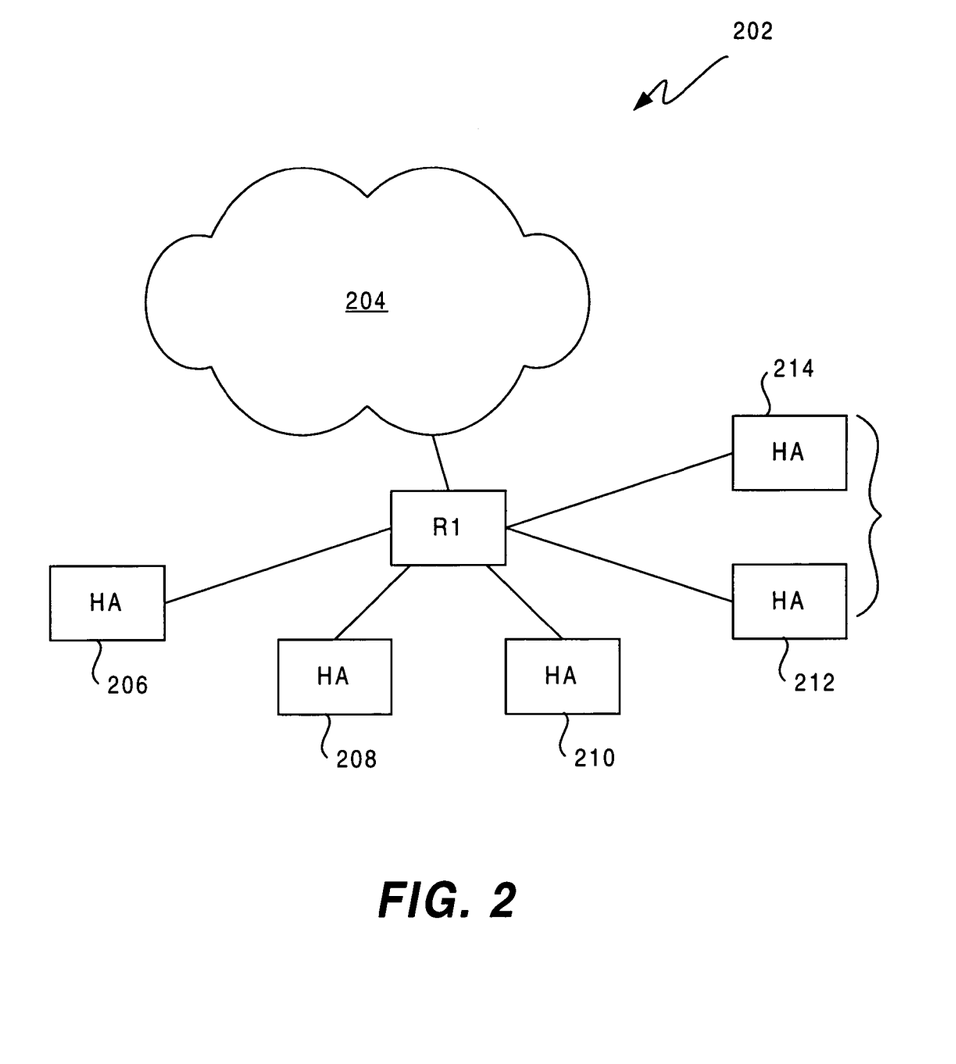
FIG. 2 is a block diagram illustrating a mobile IP network segment and associated environment without a centralized source of accounting information.

As shown in FIG. 2, storage and updating of accounting information is typically dispersed among the network devices (e.g., routers) in a typical Mobile IP network segment. Mobile IP environment 202 includes the internet (or a WAN) 204 over which various mobile nodes can communicate remotely via mediation by a corresponding Home Agent (via an appropriately configured router denoted R1).

An entity such as a corporation, business, or government may provide multiple Home Agents. Here, a first Home Agent 206, a second Home Agent 208, a third Home Agent 210, a fourth Home Agent 212, and a fifth Home Agent 214 are shown. As shown, such an environment lacks a centralized database for accounting information. Therefore, each Home Agent must be separately configured for mobile nodes supported by that Home Agent and accounting information for these mobile nodes is stored with that Home Agent. Moreover, redundant Home Agents may be provided to permit a Home Agent to serve as a backup to protect against failure by a primary Home Agent. By way of example, the fourth Home Agent 212 and the fifth Home Agent 214 may store identical accounting information in the event that one of the Home Agents fails. Thus, when accounting information is updated, the information must be updated on all of the redundant Home Agents. Accordingly, such a system requires considerable administrative overhead.

Although information associated with the activity of mobile nodes may be recorded, the information typically maintained has limited uses in a billing environment. More particularly, a mechanism for tracking the amount of information sent and/or received by selected mobile nodes has not been established. By way of example, the number of packets or bytes sent and/or received by mobile nodes operating under Mobile IP Protocol has not been monitored. Moreover, although variables may be used to update the number of registrations accepted or denied by a Home Agent as well as update the overall service time for a mobile node, these variables have not been implemented for the purposes of billing users associated with these mobile nodes. In addition, although these variables may be polled by the manager station periodically as requested, this process is not dynamic.

While billing may be performed for nodes which are not mobile, such methods may not easily be applied to mobile nodes operating under the Mobile IP Protocol. By way of example, billing is often performed through the use of time stamps. For a node which is not mobile, this method is acceptable since only two time stamps, a START time stamp and a STOP time stamp for a given session, are required to determine a total service time. However, in a Mobile IP environment, each mobile node may roam to numerous Foreign Agents while communicating with a given corresponding node. The Home Agent, which would presumably log START and STOP time stamps, sees only some of the packets associated with a session between the mobile node and the corresponding node. Thus, it may not know exactly when a session starts ands stops. Accordingly, this method of accounting and billing cannot easily be applied to mobile nodes operating under a Mobile IP Protocol.

In view of the above, a need exists for monitoring the quantity of information sent and received by mobile nodes for billing purposes. Moreover, it would beneficial if a system having centralized database management were provided to dynamically store and process this billing information for mobile nodes supported by multiple network devices.

SUMMARY OF THE INVENTION

Methods and apparatus for logging accounting information for a mobile node are disclosed. This is accomplished through the use of a centralized server which provides accounting services. The server may store and update accounting information for multiple network devices. In addition, the centralized server may have access to billing software capable of generating bills from the accounting information.

According to one aspect of the invention, a method of updating accounting information for a mobile node operating according to Mobile IP Protocol is provided. A network device which supports Mobile IP composes a request packet for the mobile node. The request packet identifies the mobile node and includes at least one "counter" associated with accounting information pertaining to the mobile node. The request packet is then sent to a server adapted for performing accounting.

Various counters may be provided in the request packet. By way of example, a counter may indicate the number of packets or bytes that have been sent to or from the mobile node. As yet another example, a counter may be used to indicate the total service time for the mobile node. Thus, the quantity of information that is sent and received by mobile nodes may be monitored for billing purposes.

According to another aspect of the invention, the server receives the request packet from the network device and logs the accounting information for the mobile node. A reply packet may then be sent to the network device acknowledging logging of the accounting information pertaining to the mobile node. In addition, a bill for Mobile IP services may be generated from the accounting information.

The present invention provides a system having centralized database management which dynamically updates and processes accounting information for billing purposes. Moreover, the system is capable of processing this information for mobile nodes supported by multiple network devices.

DETAILED DESCRIPTION OF THE INVENTION

In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to unnecessarily obscure the present invention.

The present invention provides methods and apparatus for logging accounting information for a mobile node and generating a bill for Mobile IP services from this accounting information. This is accomplished through the use of a centralized server which provides accounting services. The server may store and update accounting information for multiple network devices. In addition, the centralized server may have access to billing software which generates bills from the accounting information.

As described above with reference to FIG. 2, due to the lack of a centralized database, the amount of accounting information that may be stored by each network device is limited.

Moreover, since each Home Agent must be separately configured, such a system requires a considerable amount of administrative support and increases the probability that errors may be introduced by a user configuring the system. Accordingly, it would be desirable if a single system having a centralized repository were implemented to store some or all of the accounting information for the mobile nodes supported by one or more Home Agents or Foreign Agents.

Figure 3:
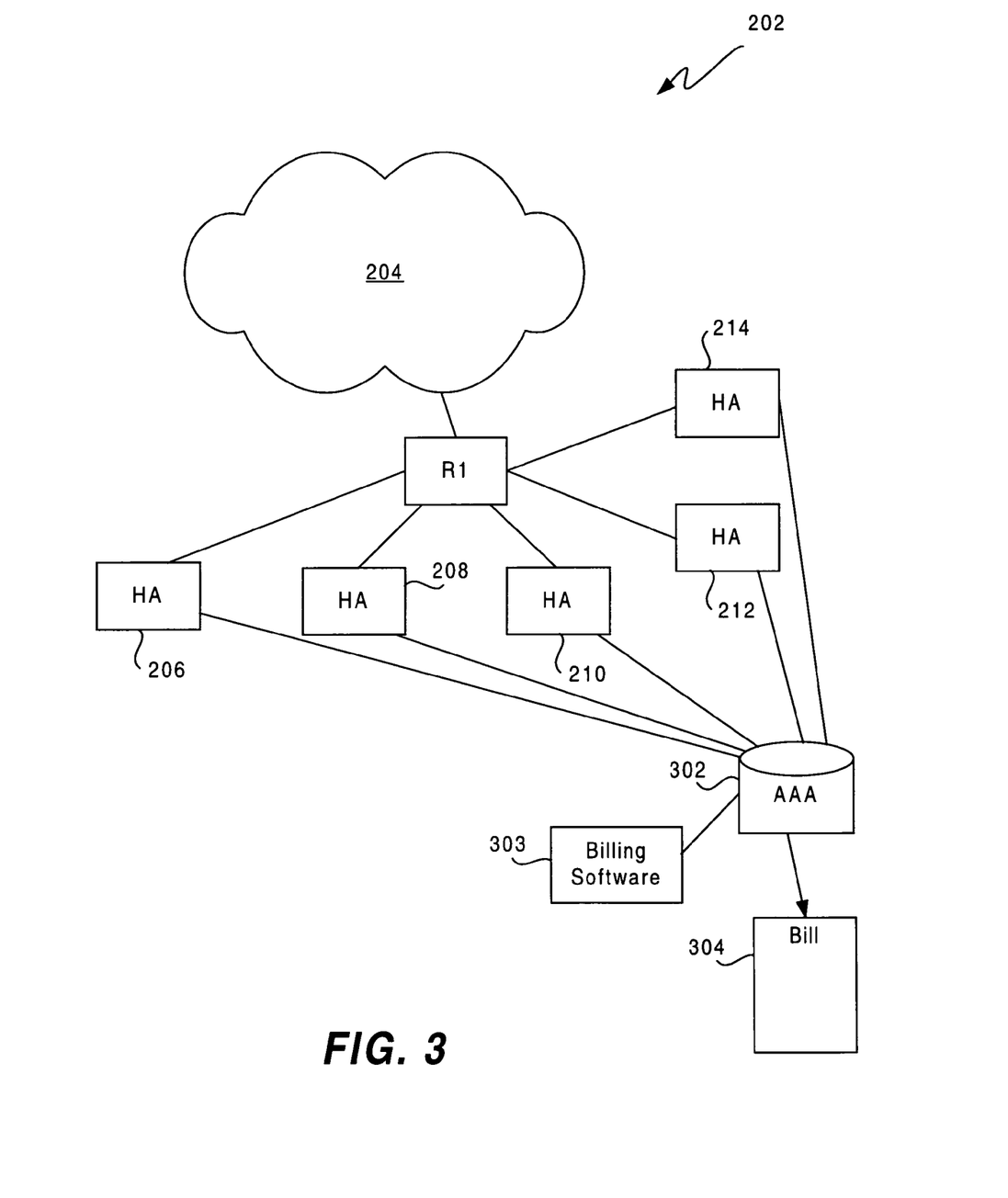
FIG. 3 is a block diagram illustrating a mobile IP network segment and associated environment having a centralized database as a source for accounting information according to one embodiment of the invention.

An invention is described herein that provides such a centralized repository (e.g., a database). FIG. 3 is a block diagram illustrating a mobile IP network segment and associated environment having a centralized database as a source for accounting information according to one embodiment of the invention. Unlike the system of FIG. 2, an environment in which a centralized database, or server 302, is provided. As shown, the server may be coupled to multiple routers or other network devices operating under the Mobile IP Protocol (e.g., Home Agents or Foreign Agents) via a network. In addition, this centralized server 302 may be adapted for performing certain Mobile IP functions as implemented by software, hardware, and/or firmware. In one example, server 302 is configured to authenticate or assist in authenticating a Mobile IP registration request from a mobile node. See U.S. patent application Ser. No. 09/227,399, filed on the same day as the instant application, titled "MOBILE IP AUTHENTICATION," and naming K. Leung as inventor, which is incorporated herein by reference for all purposes. In addition to updating accounting information, the server may have access to billing software 303, which resides on the server or is easily accessible to the server. The billing software may then be used to generate a bill 304 using the accounting information stored on the server 302. In this manner, accounting may be used to account for services used by a particular mobile node in a billing environment.

In addition to providing a centralized server which is capable of storing and updating accounting information for multiple mobile nodes as well as multiple network devices, the centralized server may provide further services. By way of example, the centralized server may provide authentication services and/or authorization services. While authentication determines "who" an entity is, authorization determines what services a user is allowed to perform, or access. A class of servers known as "AAA" or triple-A servers may be employed. The AAA represents authentication, authorization, and accounting. Various protocols such as the Remote Authentication Dial In User Service (RADIUS) and TACACS+ may be implemented to provide such a server. Note that the Home Agent or Foreign Agent providing accounting information to the server must provide communications in formats required by the AAA serverprotocol. RFC 2138 describes the RADIUS Protocol and is hereby incorporated by reference. Similarly, RFC 1492 describes TACACS and the Internet-Draft "The TACACS+ Protocol Version 1.78," available at http://www.ietf.org/internet-drafts/draft-grant-tacacs-02.txt, describes TACACS+. Both of these documents are incorporated herein by reference for all purposes.

Figure 4:
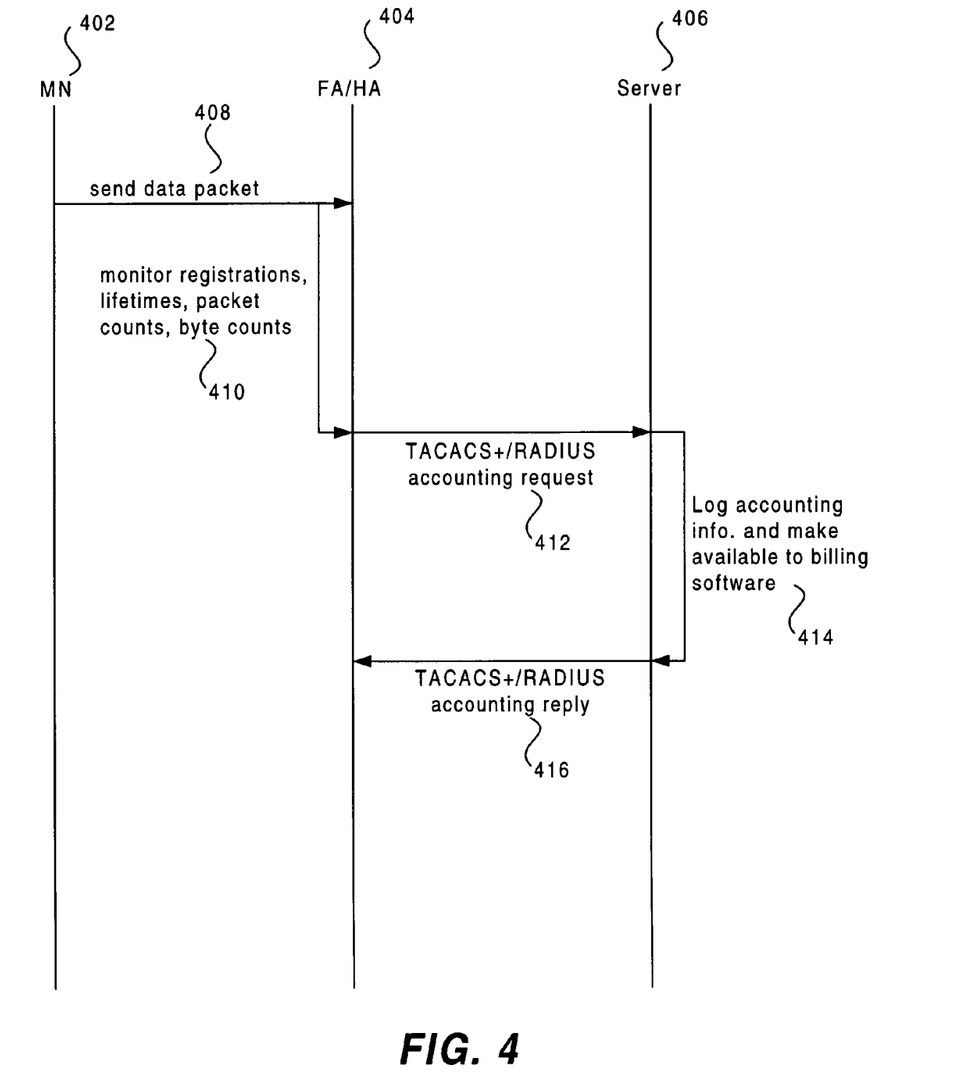
FIG. 4 is a process flow diagram illustrating the steps performed during the update of accounting information pertaining to a mobile node according to one embodiment of the invention.

FIG. 4 is a process flow diagram illustrating the steps performed during a method of updating accounting information pertaining to a mobile node and billing in Mobile IP according to one embodiment of the invention. As shown in FIG. 4, vertical line 402 represents steps performed by the mobile node, vertical line 404 represents steps performed by the network device (e.g., Home Agent or Foreign Agent) and vertical line 406 represents steps performed by the server. At step 408, the mobile node sends a packet to the network device. By way of example, the packet may be a data packet sent during a Mobile IP session or a registration request packet. At step 410, the network device monitors the activity of the mobile node. By way of example, the network device may update one or more variables (e.g., counters) indicating the number of packets that have been sent to/from the mobile node, the total service time (e.g., cumulative registration lifetimes), the number of bytes that have been sent to/from the mobile node, or the total service time for the mobile node. As yet another example, where the network device is a Home Agent, a counter may be updated to indicate the number of registrations accepted or denied by the Home Agent. Depending upon the type of information being monitored, the counters may be updated at various intervals. By way of example, if the monitored information is service time, the counters may be updated periodically after a predetermined time period. As yet another example, the counters may be updated after each registration or after one or more packets are received or sent by the mobile node.

Once the counters have been updated, the counters may be used to update the accounting information stored on the server. At step 412, a request packet for the mobile node is composed and sent to a server adapted for logging accounting information. By way of example, the request packet may identify the mobile node and include at least one counter associated with accounting information pertaining to the mobile node. By way of example, in accordance with the TACACS+ Protocol, the request packet may be an accounting REQUEST packet. Step 412 may be triggered by various trigger events. Thus, not every update of a counter in the network device necessarily results in sending a request packet to the server. For example, only certain accounting relevant events may trigger sending the information to the server. Examples of such trigger events include initiating a new registration, terminating a registration, passing a threshold number packets or bytes, etc.

The server receives the request packet from the network device and logs the accounting information provided in the accounting request at step 414. As described above, the accounting request identifies the mobile node and may include at least one variable (e.g., counter) associated with the accounting information. The server may then store and/or manipulate the counter to generate appropriate accounting information. It may even generate a bill for Mobile IP services from the accounting information. The bill may then be sent to the user through a variety of mechanisms. In addition, the server may send a reply packet to the network device acknowledging logging of the accounting information pertaining to the mobile node at step 416. By way of example, in accordance with the TACACS+ Protocol, the request packet may be an accounting REPLY packet. Such a reply packet may indicate a status of PASS or FAIL in relation to the logging of the accounting information.

As described above, the server may log accounting information for multiple network devices. The network devices may be Foreign Agents as well as Home Agents. However, it is important to recognize that traffic may be unidirectional and therefore may be not be received by both the Home Agent and the Foreign Agent. By way of example, registration of mobile nodes may be performed at the Home Agent without direct participation by a Foreign Agent. As yet another example, a packet sent from a mobile node visiting a Foreign Agent may be sent directly to a corresponding node without communicating with its Home Agent. In order to ensure that all relevant Mobile IP usage is captured, accounting information may be sent between a Foreign Agent and the visiting mobile node's Home Agent. By way of example, when a mobile node sends a packet (e.g., a data packet) to a corresponding node, the packet may be reverse tunneled from the Foreign Agent to the Home Agent. In this manner, reverse tunneling may be used to ensure that accounting information stored on a server associated with one or more Home Agents is accurate. Alternatively, the Foreign Agent may generate its own counters (e.g., number of bytes sent from the mobile node to the corresponding node) and transmit those counters to the Home Agent. In another alternative embodiment, it may be preferable to provide a server on a network for use by one or more Foreign Agents rather than a Home Agent.

The present invention provides methods and apparatus for logging accounting information for mobile nodes and generating bills for Mobile IP services associated with this accounting information. Although the servers of this invention are described with reference to TACACS+ and RADIUS, any suitable protocol may be implemented. In this manner, a mobile node may be billed for information that is sent as well as received by the mobile node. Such servers may run on a PC or workstation such as a UNIX workstation.

The invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, and optical data storage devices.

The apparatus (Home Agent, Foreign Agent, and/or mobile node) of this invention may be specially constructed for the required purposes, or may be a general purpose programmable machine selectively activated or reconfigured by a computer program stored in memory. The processes presented herein are not inherently related to any particular router or other apparatus. In a preferred embodiment, any of the Home and Foreign Agents and mobile nodes of this invention may be specially configured routers such as specially configured router models 2500, 2600, 3600, 4000, 4500, 4700, 7200, and 7500 available from Cisco Systems, Inc. of San Jose, Calif. A mobile node that is a router is known as a "mobile router." A general structure for some of these machines will appear from the description given below.

Figure 5:
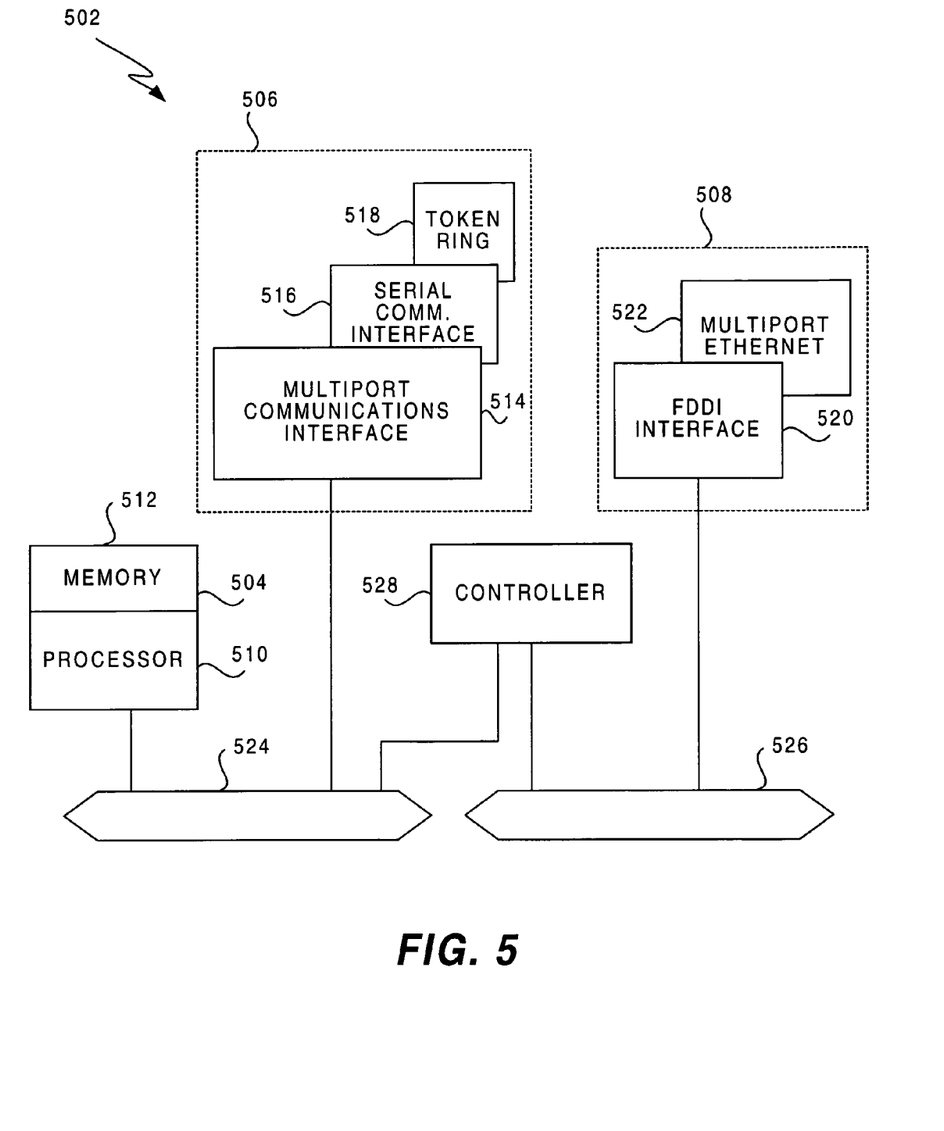
FIG. 5 is a block diagram of a network device that may be configured to implement aspects of the present invention.

Referring now to FIG. 5, a router/agent 502 of the present invention includes a master central processing unit (CPU) 504, low and medium speed interfaces 506, and high speed interfaces 508. When acting under the control of appropriate software or firmware, the CPU 504 is responsible for such router tasks as routing table computations and network management. It is also responsible for registration, packet tunneling and other Mobile IP functions of a Home Agent or a Foreign Agent. It may include one or more microprocessor chips 510 selected from complex instruction set computer (CISC) chips (such as the Motorola MPC860 microprocessor or the Motorola 68030 microprocessor, reduced instruction set computer (RISC) chips, or other available chips. In a preferred embodiment, a memory 512 (such as non-volatile RAM and/or ROM) also forms part of CPU 504. However, there are many different ways in which memory could be coupled to the system.

The interfaces 508 and 506 are typically provided as interface cards. Generally, they control the sending and receipt of data packets over the network and sometimes support other peripherals used with the router 502. The low and medium speed interfaces 506 include a multiport communications interface 514, a serial communications interface 516, and a token ring interface 518. The high speed interfaces 508 include an FDDI interface 520 and a multiport ethernet interface 522. Preferably, each of these interfaces (low/medium and high speed) includes (1) a plurality of ports appropriate for communication with the appropriate media, and (2) an independent processor such as the 2901 bit slice processor (available from Advanced Micro Devices corporation of Santa Clara Calif.), and in some instances (3) volatile RAM. The independent processors control such communications intensive tasks as packet switching and filtering, and media control and management. By providing separate processors for the communications intensive tasks, this architecture permits the master microprocessor 504 to efficiently perform routing computations, network diagnostics, security functions, etc.

The low and medium speed interfaces are coupled to the master CPU 504 through a data, control, and address bus 524. High speed interfaces 508 are connected to the bus 524 through a fast data, control, and address bus 526 which is in turn connected to a bus controller 528. The bus controller functions are provided by a processor such as a 2901 bit slice processor.

Although the system shown in FIG. 5 is a preferred router of the present invention, it is by no means the only router architecture on which the present invention can be implemented. For example, an architecture having a single processor that handles communications as well as routing computations, etc. would also be acceptable. Further, other types of interfaces and media could also be used with the router. Still further, in some cases, the invention can be implemented on network devices other than routers.

Although illustrative embodiments and applications of this invention are shown and described herein, many variations and modifications are possible which remain within the concept, scope, and spirit of the invention, and these variations would become clear to those of ordinary skill in the art after perusal of this application. For instance, although the specification has described routers, other entities used to tunnel packets to mobile nodes on remote network segments can be used as well. For example, bridges or other less intelligent packet switches may also employ the standby protocol of this invention. Accordingly, the present embodiments are to be considered as illustrative and not restrictive, and the invention is not to be limited to the details given herein, but may be modified within the scope and equivalents of the appended claims.

What is claimed is:

1. A network device which supports Mobile IP protocol and is configured to send an accounting request, the accounting request identifying a mobile node supporting the Mobile IP protocol, the network device comprising:
   a memory; and
   a processor coupled to the memory, wherein the network device is adapted for updating a counter associated with the mobile node's activity during a Mobile EP session, the network device adapted for sending the accounting request to a AAA server supporting a AAA protocol in response to a trigger event, the accounting request both identifying the mobile node and including the counter, wherein the accounting request indicates a request to update accounting information associated with the mobile node using the counter, the trigger event being one of a lapse of a predetermined period of time, initiation or termination of a registration of the mobile node, and when a number of packets are received or sent by the mobile node, the server being adapted for recording accounting information associated with the mobile node using the counter, the network device being a Home Agent supporting the mobile node or a Foreign Agent to which the mobile node has roamed, wherein the server maintains accounting information for a plurality of mobile nodes supported by a plurality of Home Agents, the accounting information being received from a plurality of network devices, each of the plurality of network devices being a Home Agent or a Foreign Agent supporting the Mobile IP protocol and the AAA protocol and being adapted for sending an accounting request to the AAA server in the AAA protocol to update accounting information associated with a mobile node in response to the trigger event, wherein the AAA server does not support the Mobile IP protocol.

2. The network device as recited in claim 1, wherein the counter indicates at least one of a number of packets received by the mobile node, a number of packets sent from the mobile node, a total service time for the mobile node, a number of bytes that have been sent to the mobile node and a number of bytes that have been sent from the mobile node.

3. A server in communication with a plurality of network devices supporting Mobile IP protocol and configured to receive an accounting request from the plurality of network devices, each of the plurality of network devices being a Home Agent or a Foreign Agent supporting the Mobile IP protocol, the accounting request identifying a mobile node, the server comprising:
   a memory; and
   a processor coupled to the memory, wherein the server is a AAA server supporting a AAA protocol, and wherein the server is adapted for storing accounting information for a plurality of mobile nodes supported by the plurality of network devices and logging accounting information associated with the mobile node in response to the accounting request received from one of the plurality of network devices in the AAA protocol supported by the AAA server, the network device being a Home Agent or a Foreign Agent supporting the Mobile IP protocol and the AAA protocol, the accounting request including at least one counter associated with the accounting information, the plurality of mobile nodes being supported by a plurality of Home Agents, wherein the accounting request indicates a request to update the accounting information associated with the mobile node using the at least one counter, the at least one counter indicating at least one of a number of packets that have been sent to the mobile node, a number of packets that have been sent from the mobile node, a total service time for the mobile node, a number of bytes that have been sent to the mobile node and a number of bytes that have been sent from the mobile node, wherein the AAA server does not support the Mobile IP protocol.

4. The server as recited in claim 3, wherein the server is adapted for sending an accounting reply to the network device in response to the accounting request, the accounting reply acknowledging logging of the accounting information pertaining to the mobile node.

5. The server as recited in claim 3, wherein the counter indicates a number of registrations that have been accepted.

6. The server as recited in claim 3, wherein the server is a TACACS+ or a RADIUS server.

7. In a network device which supports Mobile IP protocol, a method of updating accounting information for a mobile node operating according to the Mobile IP protocol during a Mobile EP session, comprising:
   composing a request packet for the mobile node in response to a trigger event, the trigger event being one of a lapse of a predetermined period of time, initiation or termination of a registration of the mobile node, and when a number of packets are received or sent by the mobile node, the request packet identifying the mobile node and including at least one counter associated with accounting information pertaining to the mobile node, wherein the request packet indicates a request to update accounting information associated with the mobile node using the at least one counter, wherein the request packet is composed in accordance with a AAA protocol; and
   sending the request packet to a AAA server supporting the AAA protocol, wherein the AAA server is adapted for performing accounting for the identified mobile node using the at least one counter in response to the request packet, the at least one counter indicating at least one of a number of packets that have been sent to the mobile node, a number of packets that have been sent from the mobile node, a total service time for the mobile node, a number of bytes that have been sent to the mobile node and a number of bytes that have been sent from the mobile node, the network device being a Home Agent supporting the mobile node or a Foreign Agent to which the mobile node has roamed, wherein the AAA server maintains accounting information for a plurality of mobile nodes supported by a plurality of Home Agents, the accounting information being received from a plurality of network devices, each of the plurality of network devices being a Home Agent or a Foreign Agent supporting the Mobile IP protocol and the AAA protocol, wherein the AAA server does not support the Mobile IP protocol.

8. The method as recited in claim 7, further comprising:
   receiving a reply packet for the mobile node identified in the request packet from the server, the reply packet acknowledging logging of the accounting information pertaining to the mobile node.

9. The method as recited in claim 7, wherein the counter indicates a number of registrations that have been accepted.

10. The method as recited in claim 7, wherein the AAA server is a TACACS+ or a RADIUS server.

11. The method as recited in claim 7, further comprising:
   receiving a data packet from the mobile node, wherein composing the request packet is performed in response to receiving the data packet.

12. The method as recited in claim 11, further comprising:
   forwarding the data packet to another network device.

13. The method of claim 7, wherein composing a request packet for the mobile node is triggered by an accounting event.

14. The method of claim 13, wherein the accounting event is a new registration or the termination of a registration.

15. In a AAA server that does not support Mobile IP protocol, the AAA server configured to maintain accounting information for a plurality of mobile nodes supported by a plurality of network devices, the accounting information being received from the plurality of network devices, each of the plurality of network devices being a Home Agent or a Foreign Agent supporting Mobile IP protocol, a method of updating accounting information for a mobile node operating according to the Mobile IP protocol during a Mobile IP session, comprising:

receiving a request packet from a network device operating under the Mobile IP protocol and a AAA protocol supported by the AAA server, the request packet being sent in accordance with the AAA protocol, the request packet identifying the mobile node and including at least one counter associated with accounting information pertaining to the mobile node, wherein the request packet indicates a request to update accounting information associated with the mobile node using the at least one counter, the network device being a Home Agent supporting the mobile node or a Foreign Agent to which the mobile node has roamed, the at least one counter indicating at least one of a number of packets that have been sent to the mobile node, a number of packets that have been sent from the mobile node, a total service time for the mobile node, a number of bytes that have been sent to the mobile node and a number of bytes that have been sent from the mobile node; and logging the accounting information for the mobile node identified in the request packet using the at least one counter of the request packet.

16. The method as recited in claim 15, further comprising:
sending a reply packet for the mobile node identified in the request packet, the reply packet acknowledging logging of the accounting information pertaining to the mobile node.

17. The method as recited in claim 15, further comprising:
generating a bill for Mobile IP services from the accounting information.

18. The method as recited in claim 15, wherein the counter indicates a number of registrations that have been accepted.

19. The method as recited in claim 15, wherein the server is a TACACS+ or a RADIUS server.

20. A computer-readable medium having thereon computer readable instructions for updating accounting information for a mobile node in a network device that supports Mobile EP protocol during a Mobile IP session, the instructions comprising:

instructions for composing a request packet for the mobile node in response to a trigger event, the trigger event being one of a lapse of a predetermined period of time, initiation or termination of a registration of the mobile node, and when a number of packets are received or sent by the mobile node, the request packet identifying the mobile node and including at least one counter associated with accounting information pertaining to the mobile node, wherein the request packet indicates a request to update accounting information associated with the mobile node using the at least one counter, wherein the request packet is composed in accordance with a AAA protocol; and instructions for sending the request packet to a AAA server supporting the AAA protocol, wherein the AAA server is adapted for performing accounting for the identified mobile node using the at least one counter in response to the request packet, the at least one counter indicating at least one of a number of packets that have been sent to the mobile node, a number of packets that have been sent from the mobile node, a total service time for the mobile node, a number of bytes that have been sent to the mobile node and a number of bytes that have been sent from the mobile node, the network device being a Home Agent supporting the mobile node or a Foreign Agent to which the mobile node has roamed, wherein the AAA server maintains accounting information for a plurality of mobile nodes supported by a plurality of Home Agents, the accounting information being received from a plurality of network devices, each of the plurality of network devices being a Home Agent or a Foreign Agent supporting the Mobile IP protocol and the AAA protocol, wherein the AAA server does not support the Mobile IP protocol.

21. The computer-readable medium as recited in claim 20, further comprising:
instructions for receiving a reply packet for the mobile node identified in the request packet, the reply packet acknowledging logging of the accounting information for the mobile node.

22. A computer-readable medium having thereon computer readable instructions for updating accounting information for a mobile node in a AAA server that does not support Mobile IP protocol during a session, the AAA server supporting a AAA protocol and configured to maintain accounting information for a plurality of mobile nodes, the accounting information being received from a plurality of network devices, each of the plurality of network devices being a Home Agent or a Foreign Agent supporting Mobile EP protocol and the AAA protocol, the instructions comprising:

instructions for receiving a request packet from a network device operating under the Mobile EP protocol, the request packet being sent in accordance with the AAA server protocol supported by the AAA server, the request packet identifying the mobile node and including at least one counter associated with accounting information pertaining to the mobile node, wherein the request packet indicates a request to update accounting information associated with the mobile node using the at least one counter, the network device being a Home Agent supporting the mobile node or a Foreign Agent to which the mobile node has roamed, the at least one counter indicating at least one of a number of packets that have been sent to the mobile node, a number of packets that have been sent from the mobile node, a total service time for the mobile node, a number of bytes that have been sent to the mobile node and a number of bytes that have been sent from the mobile node; and instructions for logging the accounting information for the mobile node using the at least one counter.

23. The computer-readable medium as recited in claim 22, further comprising:
instructions for sending a reply packet for the mobile node identified in the request packet, the reply packet acknowledging logging of the accounting information for the mobile node.

24. The network device as recited in claim 1, wherein the network device is adapted for sending the accounting request including the counter to the server when a packet is sent by the mobile node or received by the mobile node.

25. The network device as recited in claim 1, wherein the accounting request further includes a value associated with the counter.

26. The network device as recited in claim 2, wherein the packets received by the mobile node and sent by the mobile node are intercepted by the network device.

27. The server as recited in claim 3, wherein the accounting request further includes a value associated with the counter.

28. The server as recited in claim 3, wherein the total service time is a total of one or more registration lifetimes for the mobile node.

29. A network device which supports Mobile IP protocol and adapted for updating accounting information for a mobile node operating according to the Mobile IP protocol during a Mobile IP session, comprising:
   means for composing a request packet for the mobile node in response to a trigger event, the trigger event being one of a lapse of a predetermined period of time, initiation or termination of a registration of the mobile node, and when a number of packets are received or sent by the mobile node, the request packet identifying the mobile node and including at least one counter associated with accounting information pertaining to the mobile node, wherein the request packet indicates a request to update accounting information associated with the mobile node using the at least one counter, wherein the request packet is composed in accordance with a AAA protocol; and
   means for sending the request packet to a AAA server supporting the AAA protocol, wherein the AAA server is adapted for performing accounting for the identified mobile node using the at least one counter in response to the request packet, the at least one counter indicating at least one of a number of packets that have been sent to the mobile node, a number of packets that have been sent from the mobile node, a total service time for the mobile node, a number of bytes that have been sent to the mobile node and a number of bytes that have been sent from the mobile node, the network device being a Home Agent supporting the mobile node or a Foreign Agent to which the mobile node has roamed, the AAA server in communication with a plurality of network devices supporting Mobile IP and configured to receive a request packet from the plurality of network devices, each of the plurality of network devices being a Home Agent or a Foreign Agent supporting the Mobile IP protocol and the AAA protocol, wherein the AAA server maintains accounting information for a plurality of mobile nodes, wherein the AAA server does not support the Mobile IP protocol.

30. The network device as recited in claim 1, wherein the server is a TACACS+ or a RADIUS server.

31. The network device as recited in claim 1, wherein the server is a AAA server and the accounting request is sent in accordance with a AAA server protocol.

32. The server as recited in claim 3, wherein the server is a AAA server and the accounting request is sent in accordance with a AAA server protocol.

33. The method as recited in claim 7, wherein the server is a AAA server and the request packet is sent in accordance with a AAA server protocol.

34. The method as recited in claim 33, wherein the AAA server is a TACACS+ or a RADIUS server.

35. The network device as recited in claim 1, wherein the server does not support Mobile IP.

36. The server as recited in claim 3, wherein the server does not support Mobile IP.

37. The method as recited in claim 7, wherein the server does not support Mobile IP.

38. The method as recited in claim 15, wherein the server is not a Home Agent or a Foreign Agent.

* * * * *